(12) United States Patent
Schlanger

(10) Patent No.: US 8,528,991 B2
(45) Date of Patent: Sep. 10, 2013

(54) VEHICLE WHEEL RIM

(76) Inventor: Raphael Schlanger, Wilton, CT (US)

( * ) Notice: Subject to any disclaimer, the term of this patent is extended or adjusted under 35 U.S.C. 154(b) by 0 days.

(21) Appl. No.: 12/661,154

(22) Filed: Mar. 11, 2010

(65) Prior Publication Data

US 2010/0253132 A1    Oct. 7, 2010

Related U.S. Application Data

(60) Provisional application No. 61/209,813, filed on Mar. 12, 2009.

(51) Int. Cl.
*B60B 7/01*    (2006.01)
*B60B 1/02*    (2006.01)

(52) U.S. Cl.
USPC ........................................ 301/95.104; 301/55

(58) Field of Classification Search
USPC ............... 301/55, 57, 58, 61, 95.101, 95.104, 301/95.105, 95.106, 95.11, 99, 104
See application file for complete search history.

(56) References Cited

U.S. PATENT DOCUMENTS

| | | | | |
|---|---|---|---|---|
| 451,013 A | * | 4/1891 | Ball | 301/95.105 |
| 2,030,076 A | * | 2/1936 | Sauzedde | 301/55 |
| 2,088,956 A | * | 8/1937 | Hecht | 301/67 |
| 5,104,199 A | * | 4/1992 | Schlanger | 301/64.704 |
| 5,975,645 A | * | 11/1999 | Sargent | 301/95.11 |
| 7,883,157 B2 | * | 2/2011 | Theilig et al. | 301/64.704 |
| 2007/0029868 A1 | * | 2/2007 | Chen | 301/95.102 |
| 2007/0200422 A1 | * | 8/2007 | Davis et al. | 301/95.106 |

FOREIGN PATENT DOCUMENTS

| | | | |
|---|---|---|---|
| EP | 808728 A2 | * | 11/1997 |
| FR | 2707559 A1 | * | 1/1995 |
| FR | 2887493 A1 | * | 12/2006 |
| WO | WO 9718098 A1 | * | 5/1997 |

OTHER PUBLICATIONS

Machine Translation of WO 97/18098 A1.*
Machine Translation of FR 2887493 A1.*
Machine Translation of FR 2707559 A1.*

* cited by examiner

*Primary Examiner* — Kip T Kotter

(57) ABSTRACT

A vehicle wheel, including a peripheral rim with a radially outboard spoke bed and an apex region radially inboard from the spoke bed portion; a central hub with a hub flange; a plurality of spokes extending between the rim and hub, with a first portion connected to the spoke bed and a second portion connected to the hub flange. The apex region includes a first apex portion and a second apex portion axially adjacent the first apex portion and a circumferential seam between the first apex portion and the second apex portion.

65 Claims, 12 Drawing Sheets

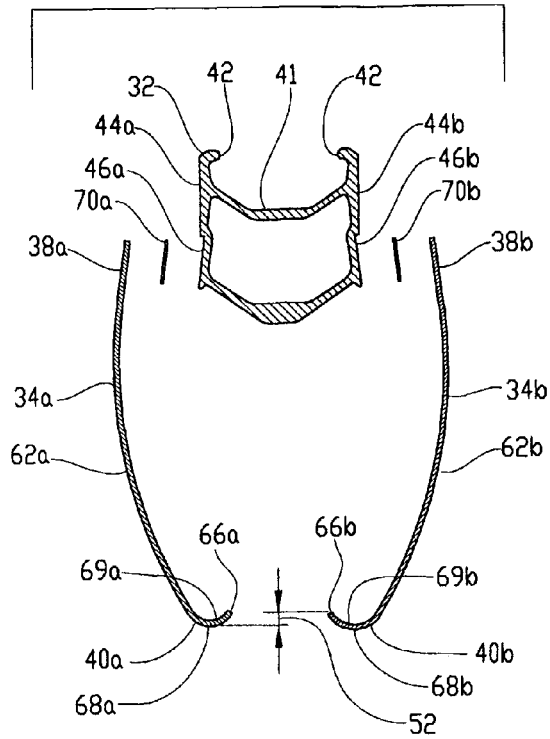
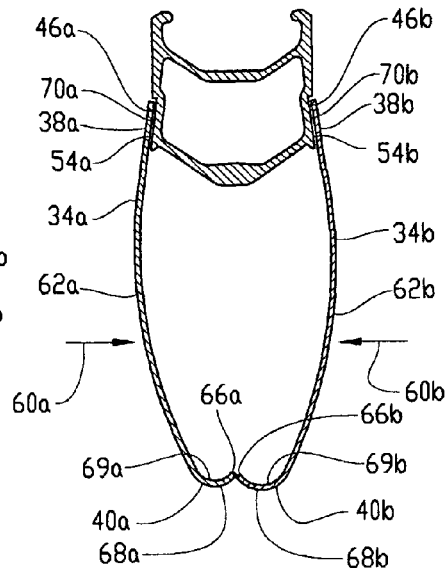
FIG. 2e
FIG. 2f
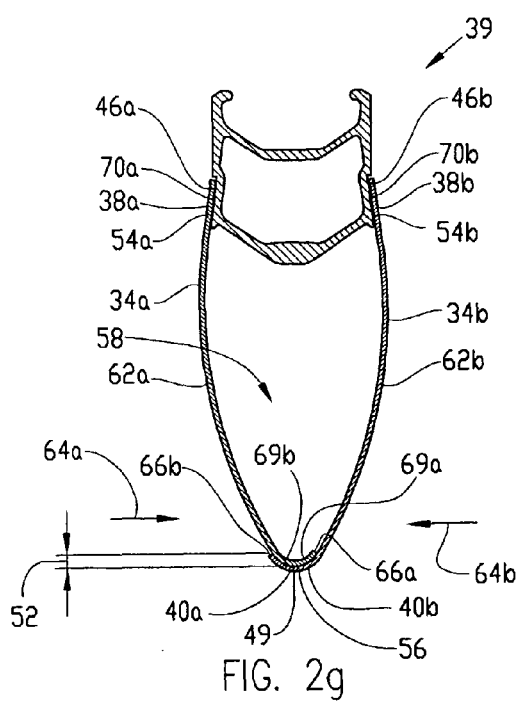
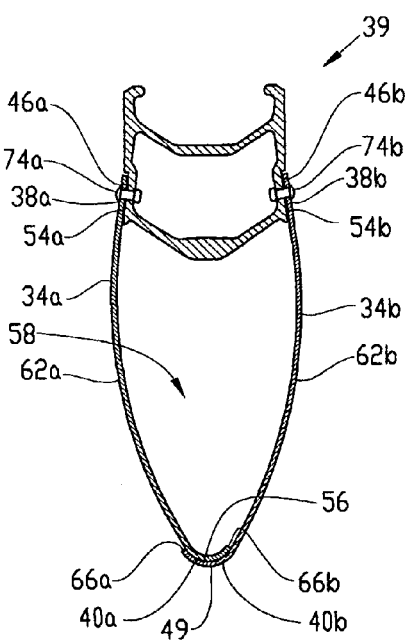
FIG. 2g
FIG. 2h

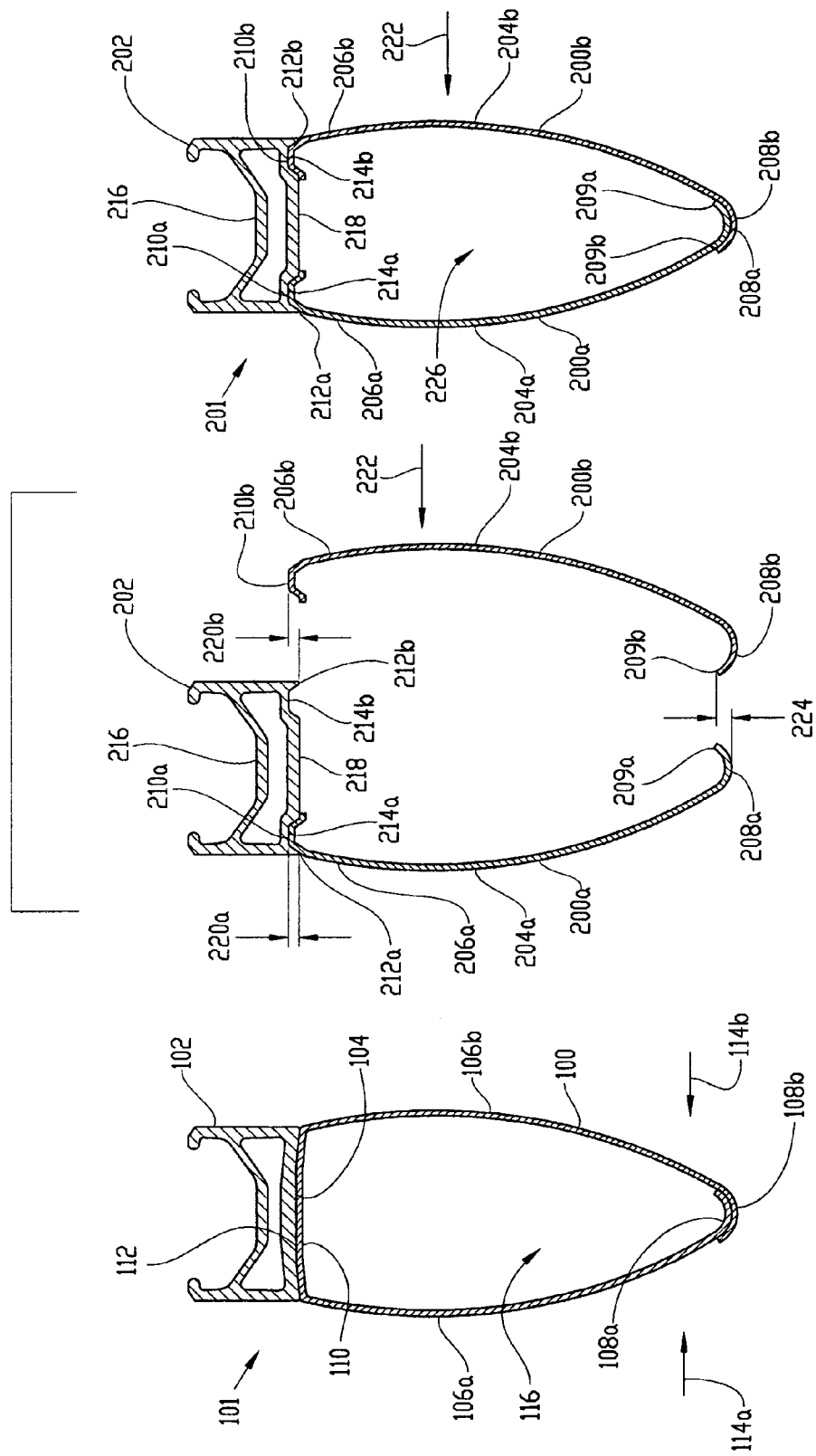

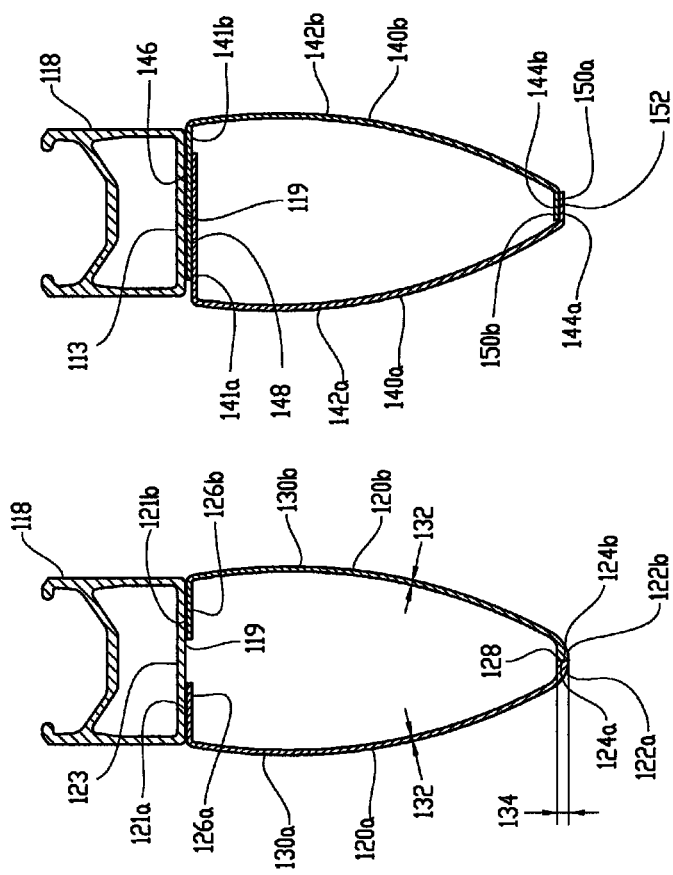

VEHICLE WHEEL RIM

CROSS-REFERENCE TO RELATED APPLICATION

This application claims priority of U.S. provisional patent application 61/209,813, filed Mar. 12, 2009, and entitled "VEHICLE WHEEL RIM".

BACKGROUND OF THE INVENTION

Description of Prior Art

In the design of high performance bicycle wheels, in addition to strength, stiffness and durability, it is an object to make the wheels as aerodynamic and as aesthetically pleasing as possible. This usually involves increasing the depth of the rim cross section. these "deep-section" rims provide greatly improved aerodynamics in comparison with more conventional shallow-section rimmed wheels. In the past decade, these deep-section wheels have become commonplace. These rims are usually produced simply as elongated conventional rims, where the spokes are fastened to the rim at the spoke bed at the radially inboard apex of the rim.

However, increasing the radial depth of the rim has several disadvantages. Firstly, these deeper section rims utilize more material and are therefore much heavier. These rims require additional structural material to span and structurally connect the spoke bed with the tire bed. In an effort to ameliorate this weight penalty, many makers have resorted to producing the deep-section rims out of carbon fiber or other exotic materials, which makes the rim very expensive. Further, these deep-section rims have very high radial stiffness. In comparison with their more supple shallow-section counterparts, the additional rigidity of deep-section rims results in a rougher ride, with greater rider fatigue and reduced vibration damping and stability. Still further, some spoke makers include enlarged portions near the ends of their spokes. With conventional rims, the spoke attachment point is at the inboard apex of the rim, which does not allow the rim to conceal or shield these enlarged portions of the spoke, resulting in reduced aesthetics and increased aerodynamic resistance. Yet further, these conventional deep-section rims do not provide any access to the interior cavity of the rim profile. This limits the choice of spoke attachment systems to only the most conventional designs and does not allow for greater flexibility in alternate spoke and rim designs that may provide performance advantages such as lighter weight and improved responsiveness.

A limited number of manufacturers have produced rim models that are basically constructed as a conventional shallow-section outer rim with a thin nonstructural deep-section fairing bonded to the radially inboard side of the rim. This one-piece fairing serves to provide the deep-section appearance and improved aerodynamics. In these cases, the spokes pierce through holes in the fairing and extend radially outboard to their attachment points in the spoke bed of the outer rim.

However, these fairing portions are generally produced as "U"-shaped profiles, which require a large amount of manual labor and molding complexity to achieve. With increased labor, increased molding cycle time, and increased material cost, the resulting assembly is very expensive to produce. Also, since this fairing is a one-piece element that is bonded to the outer rim at both legs of the "U", there is also no access to the hollow interior of the fairing/rim cavity, which again limits spoke design and connection options. Further, since the fairing completely surrounds the radially inboard region adjacent the spoke bed, this limits spoke connection design options even further. Still further, since the spoke holes in the fairing are radially inboard of the spoke bed, it is difficult to visually see the spoke connection and also to align the spoke connection at the spoke bed. This makes assembly and field service much more difficult.

SUMMARY OF THE INVENTION

The present invention utilizes a rim design where the structural spoke bed of the outer rim is located radially outboard of the apex region. However, the rim includes a circumferential seam or split adjacent the apex region, which allows the apex region be axially separated into two parts. And also allows the apex region to be axially joined together.

This separable/joinable apex region design provides several advantages. Firstly, the rim assembly may be made to include two rim shell portions that may each be separately formed and then assembled back-to-back in a clamshell design. This split design greatly simplifies the molding and/or processing involved to form the parts as they may now be molded with a simple axial draw between mold halves, which reduces processing cost. This also means that the clamshell portions may be produced from simple sheet material, which is generally very economical. Further, the amount of manual labor required for molding is greatly reduced in comparison with prior art designs. It is envisioned that these rim shells may be produced in a pressure forming process, indeed a very economical process that would be impossible with prior art rim designs.

Further, since only the outer rim portion is now required to support the spoke connections, the rim shells may be made of very lightweight material, which results in a completed rim assembly that may be lighter in weight than prior art designs. Still further, the rim shells provide the aerodynamic and aesthetic benefits that customers are looking for. Yet further, since the rim shells do not support the spoke connections, they may be allowed to flex slightly, which reduced the overall radial rigidity of the rim assembly, for greater rider comfort and stability than prior art rim designs.

Also, this split design provides access to the interior cavity of the rim assembly. This means that there is a wide range of alternate spoke connection designs that may be utilized with the present invention, which will provide enhanced performance and strength of the completed wheel assembly. Furthermore, with access to the interior cavity of the rim assembly, the rim cavity may be used to shield and enclose enlarged portions of the spoke(s), which further aids in aerodynamics and also adds to the available flexibility of the spoke design. Additionally, the interior access afforded by this split design provides easier assembly and lacing and also easier service in the field.

The present invention provides a wide range of options in the openings utilized to allow the spokes to pierce through the rim shell. The rim shell may be slotted to allow for passage of the spoke. This allows the rim shell to be assembled after the spoke is connected to the outer rim. It also allows the rim shell to be separated while the spokes remain connected to the outer rim. This provides tremendous design flexibility and ease of assembly and service that is not possible with prior art rim designs.

Further objects and advantages of my invention will become apparent from considering the drawings and ensuing description.

BRIEF DESCRIPTION OF THE DRAWINGS

The present invention will be more readily understandable from a consideration of the accompanying drawings, wherein:

FIGS. 2d-g are a cross-sectional views, corresponding to the view of FIG. 2d, showing the embodiment of FIG. 2b in progressive stages of assembly;

FIG. 2h is a cross-sectional view of an alternate embodiment similar to the embodiment of FIG. 2b, taken along 22-22, including rim shells joined to the outer rim by means of mechanical fasteners;

FIG. 3a is a cross-sectional view, similar the view of FIG. 2d, showing a second embodiment of the present invention, including a one-piece rim shell;

FIGS. 3b-c is a cross-sectional view, similar the view of FIG. 2d, showing a third embodiment of the present invention in successive stages of assembly, including a radial overlie engagement between the rim shell and the outer rim;

FIG. 3d is a cross-sectional view, similar the view of FIG. 2d, showing a fourth embodiment of the present invention, including an axial overlap joint between the rim shell and the outer rim and a butt joint between the rim shells;

FIG. 3e is a cross-sectional view, similar the view of FIG. 2d, showing a fifth embodiment of the present invention, including an axial overlap joint between the rim shells and between a rim shell and the outer rim;

DETAILED DESCRIPTION OF THE INVENTION

Figure 1A:
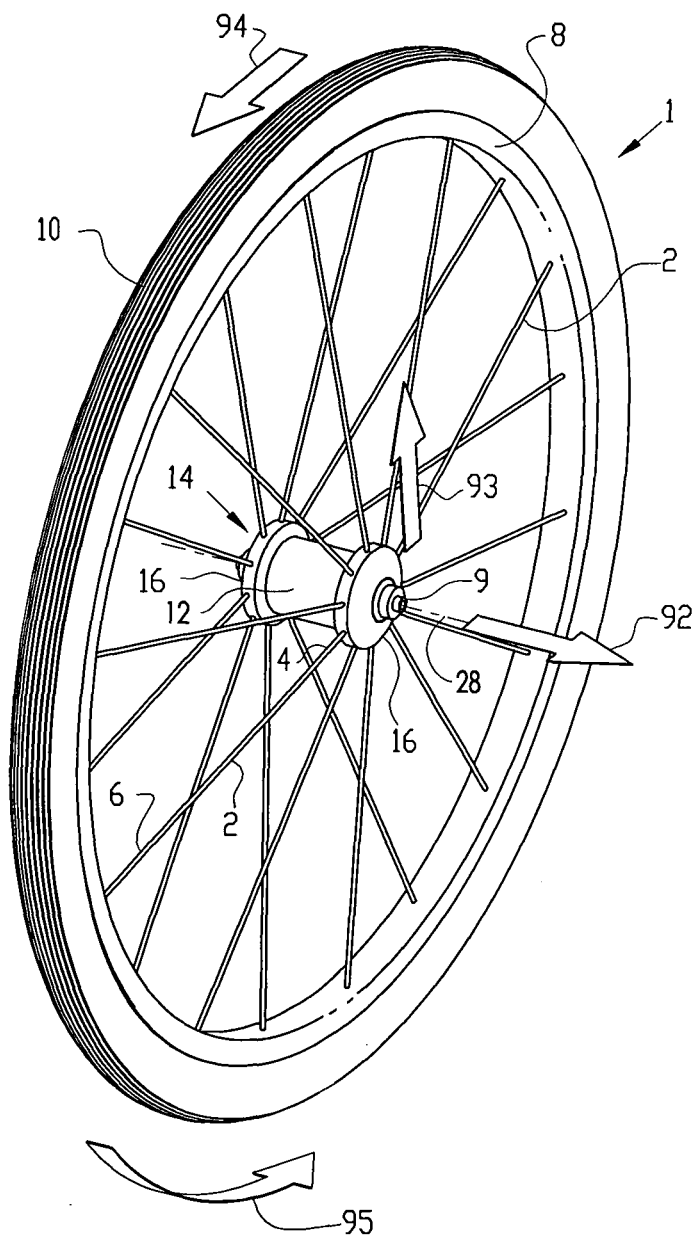
FIG. 1a is a perspective view schematically illustrating the general configuration of a prior art vehicle wheel as applied to a bicycle wheel.
Figure 2A:
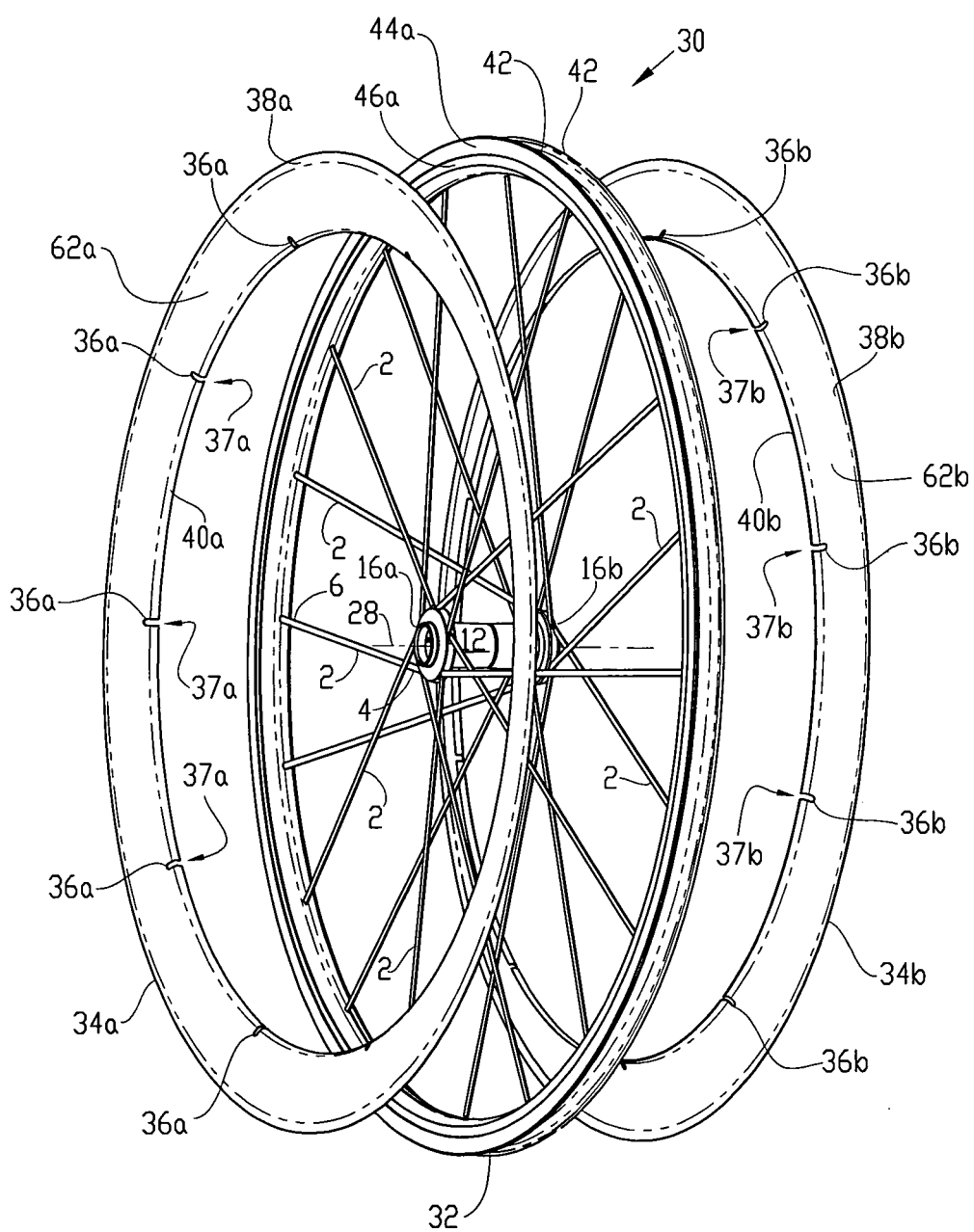
FIG. 2a is an exploded perspective view of an embodiment of the present invention, showing a bicycle wheel with rim shells prior to their assembly with the outer rim.

FIG. 1a describes the basic configuration of an exemplary vehicle wheel, in particular, a bicycle wheel 1, as well as a description of the direction conventions used throughout this disclosure. The hub shell 14 is rotatable about the axle 9 and includes at least two axially spaced hub flanges 16a and 16b (as shown in FIG. 2a), each of which include a means for connecting with the spokes 2. The hub flanges 16a and 16b may be contiguous with the hub shell 14 or they may be separately formed and assembled to the hub body 12 portion of the hub shell 14. The spokes 2 are affixed to their respective hub flanges 16a and 16b at their first end 4 and extend to attach the rim 8 at their second end 6. The tire 10 is fitted to the outer periphery of the rim 8. The axial direction 92 is any direction parallel with the axial axis 28 of the axle 9. The radial direction 93 is a direction generally perpendicular to the axial direction 92 and extending generally from the axial axis 28 radially outwardly toward the rim 8. The tangential direction 94 is a direction generally tangent to the rim at a given radius. The circumferential direction 95 is a cylindrical vector that wraps around the axial axis 28 at a given radius. The wheel of FIG. 1a is generic and may be of tension-spoke or compression-spoke design. A radial plane is a plane defined by an axial vector and a radial vector. An axial plane is defined by two radial vectors at a given common axial intercept. A radially inboard location is proximal to the axial axis 28 and a radially outboard location is distal to the axial axis 28. Similarly, an axially inboard location is proximal to a centerline plane defined by the rim 8 hoop and an axially outboard location is distal to this centerline plane.

Figure 1B:
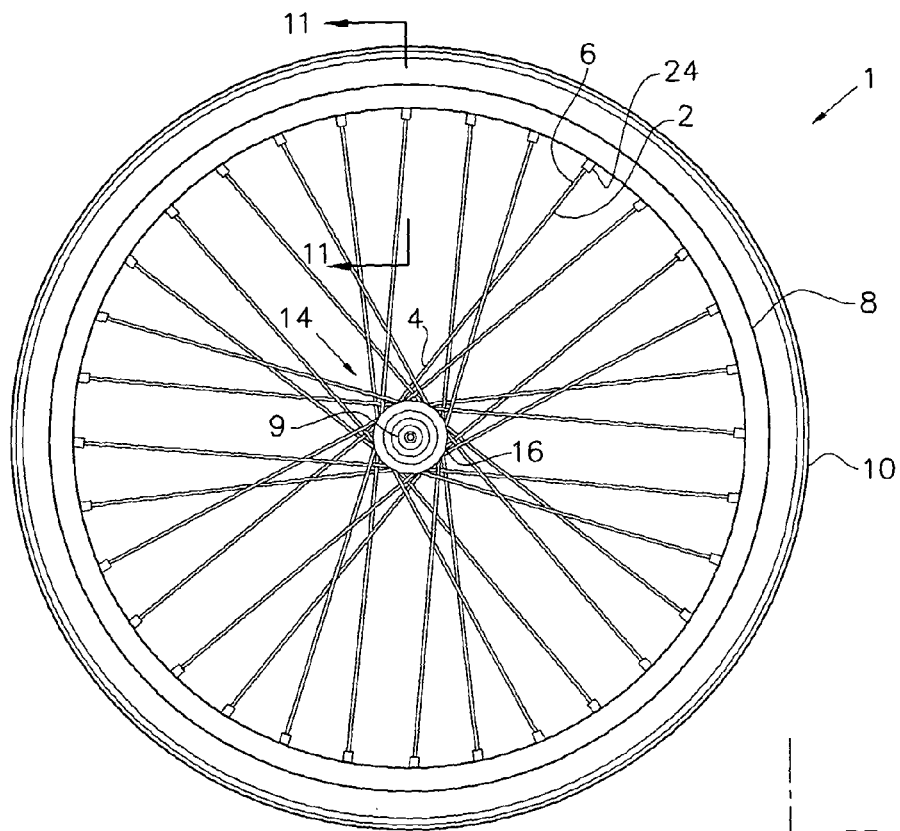
FIG. 1b is a plan view of a prior art conventional bicycle wheel, including a double-wall rim, and spoke nipples.
Figure 1C:
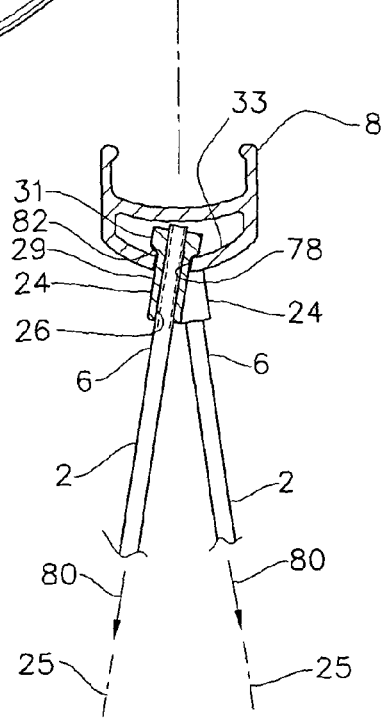
FIG. 1c is a cross-section view of the bicycle wheel of FIG. 1b as seen generally in the direction 11-11 of FIG. 1b.

FIGS. 1b-c describe the current technology in conventional bicycle wheels that most cyclists are familiar with. This prior art design includes a rim 8, a hub shell 14 and a plurality of spokes 2. The hub shell 14 is rotatable about the axle 9 and includes a pair of axially spaced hub flanges 16. The second end 6 of each spoke 2 is then fixed to the rim 8 via spoke nipples 24. Tightening the threaded engagement 26 between the spoke nipple 24 and the spoke 2 serves to effectively shorten the length of the spoke 2. Thus, as the nipples 24 are threadably tightened, the spokes 2 are drawn up tight and a degree of pre-tension is induced in the spoke 2. By selectively adjusting this threaded engagement 26, the spoke pre-tension may be adjusted to align the trueness of the rim 8. The spoke pre-tension is resisted by circumferential compression of the rim 8 and it is this balance of forces that imparts efficient structural integrity to the bicycle wheel 1.

The bicycle wheel 1 includes spokes 2, hub 14, rim 8, and tire 10. The hub 14 includes hub flanges 16 and axle 9. FIG. 1c is a detail of the prior art wheel 1 described in FIG. 1b and shows the rim 8 in cross-section. As shown in FIG. 1c, the rim 8 includes geometry for mounting of a tire 10 and a multiplicity of spoke holes 78 in its spoke bed wall 33, each to accept an individual spoke nipple 24. The spoke nipple 24 includes a shank portion 29, a head portion 31, and a transition surface 82 therebetween. Shank potion 29 is extended through spoke hole 78, with transition surface 82 bearing against the radially outboard surface of the spoke bed wall 33 in an overlie engagement, which provides blocking to resist spoke tension 80. Note that the span of spoke 2 is aligned in the direction of spoke tension 80. Spoke 2 includes a longitudinal axis 25 that is aligned in the direction of spoke tension 80 and extends through the centerline of the spoke 2.

FIG. 2a shows a vehicle wheel, in particular a bicycle wheel assembly 30, including a circumferential outer rim 32, a plurality of spokes 2, a central hub 12, two axially spaced hub flanges 16a and 16b, and two circumferential rim shells 34a and 34b, shown prior to their assembly with the outer rim 32. Rim shell 34a includes slots 36a and rim shell 34b include slots 36b. Slots 36a and 36b will provide clearance and passage for the spokes 2 when the rim shells 34a and 34b are assembled to the outer rim 32. Rim shells 34a and 34b are each separately pre-formed elements that also include associated corresponding outboard perimeter portions 38a and 38b and radially inboard apex portions 40a and 40b. The spokes 2 are connected to their respective hub flanges 16a and 16b at their first end 4 and extend to connect to the outer rim 32 at their second end 6. It should be noted that rim shells 34a and 34b are generally symmetrical components that are assembled to each other in a back-to-back clamshell arrangement.

As shown here, outer rim 32 and rim shells 34a and 34b are all pre-formed components that have been formed prior to their assembly with the outer rim 32. However, it is also envisioned that one or another of these components may be molded or plastically formed in place to complete this assembly.

Figure 2B:
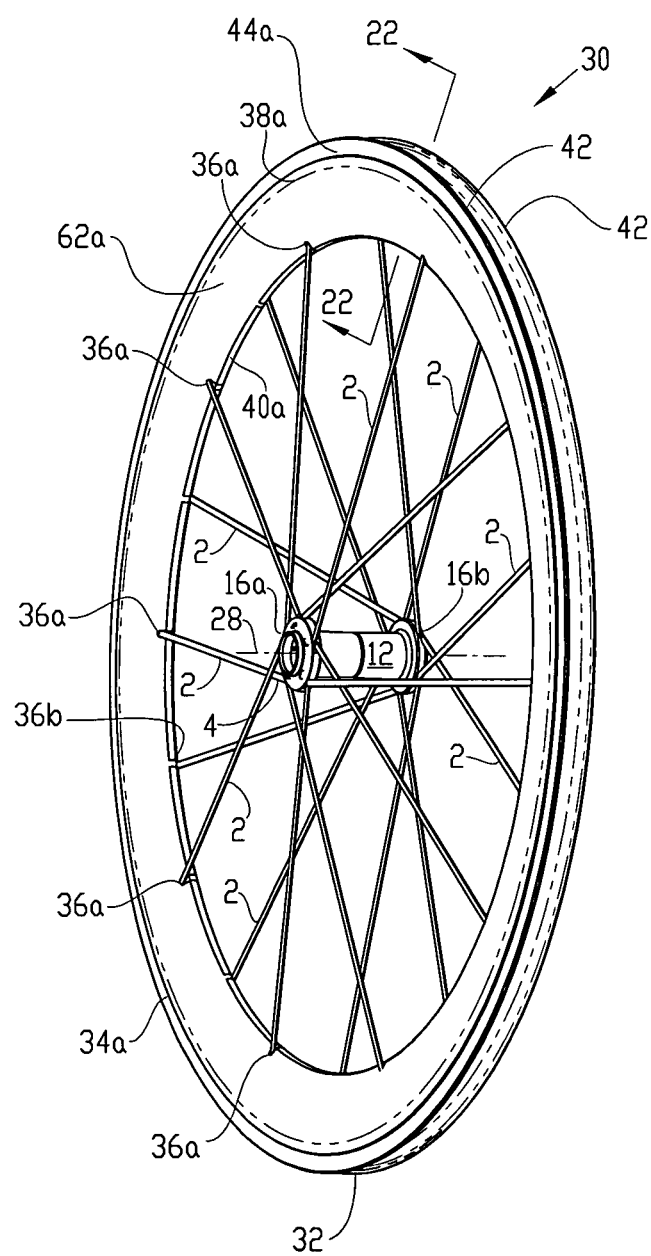
FIG. 2b is a perspective view of the embodiment of FIG. 2a, showing the rim shells assembled to the outer rim.

FIG. 2b shows the bicycle wheel assembly 30 with the rim shells 34a and 34b assembled and joined to each other and to the outer rim 32. Perimeter portion 38a of rim shell 34a is joined to one side of the outer rim 32, while the perimeter portion 38b of rim shell 34b is joined to the axially opposing side of the outer rim 32. Rim shells 34a and 34b are joined to each other at their apex portions 40a and 40b, with spokes 2 extending through respective slots 36a and 36b.

Figure 2C:
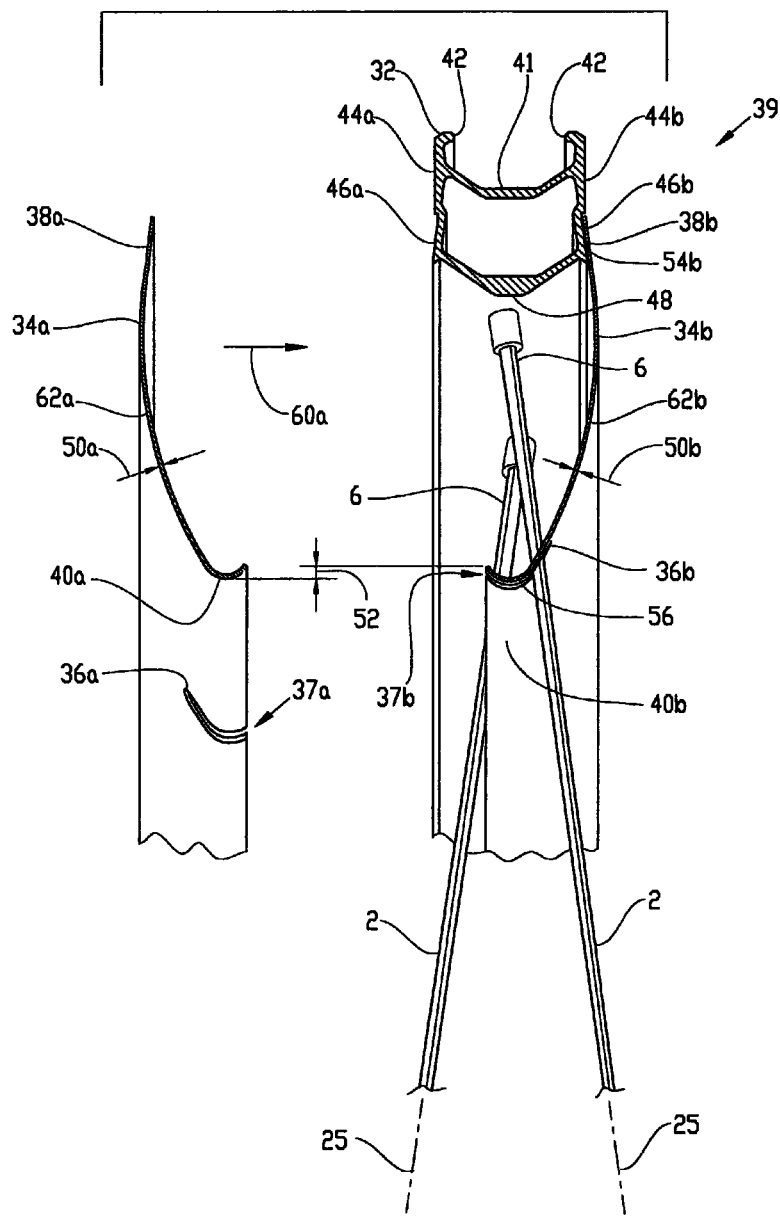
FIG. 2c is a cross-sectional view of the embodiment of FIG. 2b, taken along 22-22, prior to completed assembly of the rim shells, showing one rim shell assembled to the outer rim and another rim shell positioned prior to its assembly with the outer rim.

FIG. 2c shows the transition of assembly between the fully disassembled arrangement of FIG. 2a and the fully assembled arrangement of FIG. 2b. Outer rim 32 includes tire bed wall 41 and hooks 42 to receive a conventional tire. Outer rim 32 also includes brake track surfaces 44a and 44b and joining surfaces 46a and 46b as well as spoke bed wall 48. Joining surfaces 46a and 46b are shown to be axially offset from their respective adjacent brake track surfaces 44a and 44b. The outer rim 32 shown here is of a relatively conventional arrangement, commonly referred to as "double wall" construction to accept a clincher type tire and rim brakes. It is understood that this geometry is merely representative of a variety of rim types and geometries that may be utilized in the present invention. Rim shell 34a includes perimeter portion 38a, sidewall portion 62a, slots 36a, apex portion 40a and thickness 50a. Similarly, rim shell 34b includes perimeter portion 38b, sidewall portion 62b, slots 36b, apex portion 40b and thickness 50b.

Thus rim shell 34b is shown to be assembled to outer rim 32 such that perimeter portion 38b is joined to joining surface 46b via a joining means at corresponding outer joining interface 54b. Rim shell 34a is shown prior to its assembly with outer rim 32. It may be seen that slot 36a includes a corresponding open portion 37a and slot 36b includes a corresponding open portion 37b (see FIG. 2a). As rim shell 34a is assembled to outer rim 32 in the generally axial direction 60a, spoke 2 passes through opening 37a and enters slot 36a, which generally surrounds the cross section of the spoke 2. It may be seen that the slots 36a and 36b serve to allow rim shells 34a and 34b to be assembled in the generally axial direction to the outer rim 32 without disrupting the spokes 2.

Figure 2D:
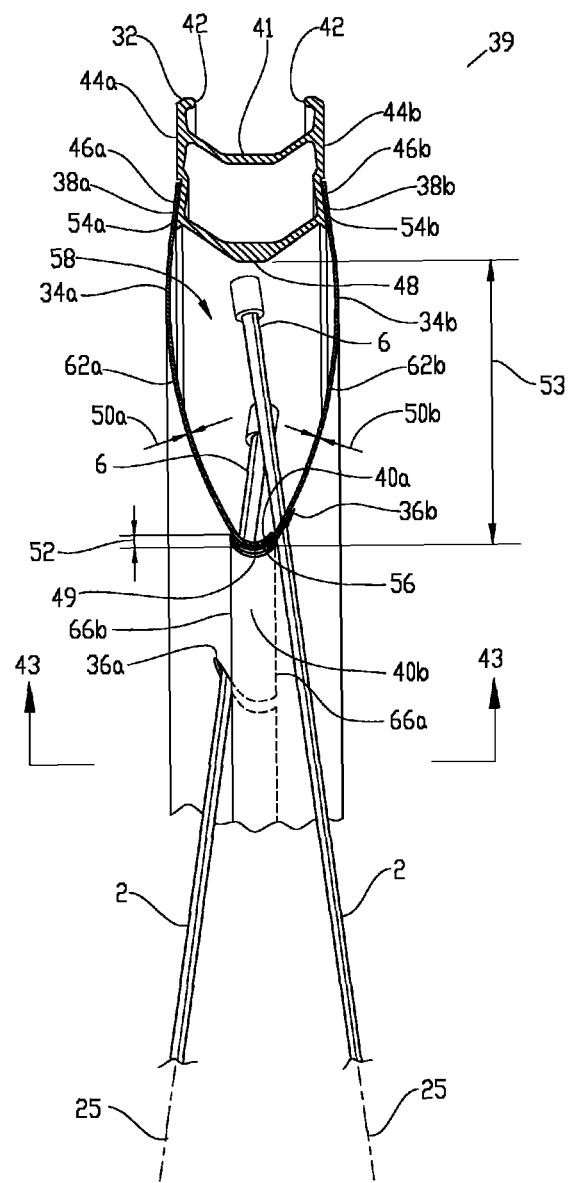
FIG. 2d is a cross-sectional view of the embodiment of FIG. 2b, taken along 22-22, showing two opposing rim shells joined to the outer rim.

FIG. 2d shows the assembly of FIG. 2b in greater detail. The joined assembly of the outer rim 32 and the rim shells 34a and 34b serve to create rim assembly 39. Apex portion 40b wraps over apex portion 40a to create a hook or radial overlie 52 for engagement between these nested portions of rim shells 34a and 34b and to create an apex region 49 of the rim assembly 39. Slot 36a is now nested around the cross section of spoke 2 as shown.

Perimeter portions 38a and 38b are joined to their respective joining surfaces 46a and 46b via a joining means at corresponding outer joining interfaces 54a and 54b. This joining means may include adhesive, mechanical fasteners, mechanical interlock and the like. A preferable joining means includes double-stick tape, a type of adhesive where the tape includes a carrier with adhesive applied to both sides. It is preferable that the joining interfaces 54a and 54b constitute continuous circumferential interfaces, although interrupted joining interfaces are also envisioned. Joining interfaces 54a and 54b are both shown here in a lap joint configuration where the joining interface occurs between adjacent overlapping surfaces. This joining interface extends in a generally radial direction and thus may be considered a radially overlapping interface. However, a wide variety of alternate joint configurations and geometries are also envisioned, including double-lap joints, butt joints, scarf joints, coverplate joints, etc.

FIG. 2d also shows the external side of apex portion 40a as overlapping and nested within the internal side of apex portion 40b at joining interface 56. Further, apex portion 40a is retained to apex portion 40b by radial overlie 52 to provide a radial interference engagement between the rim shells 34a and 34b as shown. While this radial interference engagement may be sufficient to retain apex portions 40a and 40b together, it is also envisioned that a fastening means may be utilized at the joining interface 56, such as adhesive and/or mechanical fasteners and the like. Further, apex portions 40a and 40b may also be retained together via a coverplate or adhesive tape that spans the joint between rim shells 34a and 34b in this region. Thus, the joinder of apex portions 40a and 40b may be considered to occur along a generally circumferential seam that is adjacent the interface between the rim shells 34a and 34b and the spokes 2.

As shown in FIG. 2d, a circumferential cavity 58 is created that is bounded by rim shell 34a, rim shell 34b and outer rim 32. Since the spokes 2 are structurally connected to the outer rim 32, and not to the rim shells 34a and 34b, the rim shells may be of relatively thin material and do not require the robustness to support this connection. The rim shells 34a and 34b may be utilized to provide an aerodynamic shield to the rim/spoke interface concealed within the cavity 58. Further, by effectively increasing the depth of the outer rim 32, the rim shells 34a and 34b may be utilized as a fairing connected to the outer rim 32 to reduce the aerodynamic drag of the overall rim profile. Still further, rim shells 34a and 34b may be utilized to provide structural reinforcement to the outer rim 32. It is also shown that the outer rim 32 is radially spaced from the joining interface 56 by radial gap 53.

It should be noted that the joining interface 56 constitutes a seam or split that is located adjacent the apex region 49 and adjacent the intersection of the spokes 2 and the rim shells 34a and 34b. This joining interface 56 may constitute a permanent joinder between rim shell 34a and 34b, where the joining interface 56 may not be disassembled without damaging at least one of the rim shells 34a and/or 34b. Alternatively, and preferably, the joining interface 56 may be a removable interface and may be disassembled and reassembled without damage to the rim shells 34a and 34b. Among other things, this will allow the wheel to be readily serviced and repaired in the field and will permit access to the second end 6 of the spoke 2 and its juncture with the outer rim 32.

For the purposes of definition used throughout this disclosure, the spoke bed 48 may be considered as the portion of the outer rim 32 to which the outer portions 6 of the spokes 2 are structurally connected. Similarly, the outer rim 32 may be considered as the portion of the rim assembly 39 that includes the spoke bed 48. The lire bed 41 may be considered as the radially outwardly facing portion of the outer rim 32 that supports a tire and/or inner tube. The rim shell 34*a*, 34*b* may be considered as the portion of the rim assembly 39 that extends generally radially inwardly from the spoke bed 41. The apex region 49 may be considered as the radially inboard inflection region of the rim shell 34*a*, 34*b*. The apex portion 40*a*, 40*b* of the rim shell 34*a*, 34*b* is a portion of the rim shell 34*a*, 34*b* generally adjacent the apex region 49. While the various embodiments of the present invention show a single circumferential apex portion 40*a*, 40*b*, it is also envisioned that a rim assembly 39 may alternatively include a multiplicity of axially or circumferentially spaced apex portions.

It is shown here that slots 36*a* and 36*b* provide clearance for spokes 2 to pass through the respective rim shells 34*a* and 34*b*. While a hole, rather than a slot 36*a* and/or 36*b*, may alternatively be provided for this purpose, the slot configuration is preferred. With the spokes 2 pre-assembled to the outer rim 32 (as shown in FIG. 2*a*), these slots 36*a* and 36*b* permit the rim shells 34*a* and 34*b* to be assembled axially toward each other, with the spoke introduced through the open end of the slot, as detailed in FIGS. 2*d-f*. When the apex portions 40*a* and 40*b* are assembled together, the slots 36*a* and 36*b* are closed to surround the cross section of the corresponding spokes The slots also permit axial disassembly of the rim shells 34*a* and 34*b* as well. Alternatively, it is envisioned that rim shells 34*a* and 34*b* may include holes instead of slots 36*a* and 36*b*. However, the substitution of a hole instead of a slot results in the rim shell surrounding the cross section of the spoke 2. Thus, for assembly and/or removal of a spoke or rim shell, the hole requires that the spoke 2 be completely disassembled from the outer rim 32 and then threaded along its longitudinal axis 25 through the hole, a far more cumbersome process than the procedure described in FIGS. 2*a-h*.

It should be noted that the configuration shown here shows a conventional staggered spoke 2 lacing, with the spoke connections circumferentially spaced at the outer rim 32 and alternately extending to one of two axially spaced hub flanges 16*a* and 16*b* as illustrated in FIGS. 2*a-b*. This staggered lacing means that the spokes 2 pass through the rim shells 34*a* and 34*b* at axially staggered locations. As shown in FIG. 2*d*, it may be seen that the apex portion 40*b* of rim shell 34*b* may be utilized to partially cover slot 36*a* of rim shell 34*a*, thereby leaving only a small opening portion of the slot 36*a* exposed for passage of the spoke 2. Similarly, apex portion 40*a* of rim shell 34*a* may be utilized to partially cover slot 36*b* of rim shell 34*b*, thereby leaving only a small opening portion of the slot 36*b* exposed for passage of the spoke 2. It is generally advantageous to maintain a close fit between the slots 36*a* and 36*b* and the respective spokes 2 as this minimizes aerodynamic drag at this interface and maintains a clean aesthetic appearance. As such it may be advantageous that the edges 66*a* and/or 66*b* and the joining interface 56 are closely abutting the spoke 2.

It is shown here that rim shells 34*a* and 34*b* have a generally constant cross-section thickness 50*a* and 50*b* respectively. This may be preferable and also allows the rim shells 34*a* and 34*b* to be formed from sheet material by a wide range of forming processes, including pressure forming. Alternatively, rim shells 34*a* and 34*b* may have a non-constant or variable wall thickness and may include a wide variety of geometrical features to enhance their appearance, function and/or assembly. For example, rim shells 34*a* and/or 34*b* may include ridges, bumps, bosses or other types of raised or relieved geometry that will facilitate the proper fitment or engagement between the two rim shells 34*a* and 34*b*. Also, a wide range of materials and fabrication and/or forming techniques may be utilized in their manufacture.

FIGS. 2*e-h* describe the embodiment of FIGS. 2*a-d* in greater detail and show a representative assembly sequence of the rim shells 34*a* and 34*b* and the outer rim 32. FIG. 2*e* corresponds to FIG. 2*a* and shows the rim shells 34*a* and 34*b* prior to their assembly with the outer rim 32. Rim shell 34*a* includes circumferentially extending edge 66*d*, external apex surface 68*a*, and internal apex surface 69*a*. Similarly, rim shell 34*b* includes circumferentially extending edge 66*b*, external apex surface 68*b*, and internal apex surface 69*b*. Internal apex surfaces 69*a* and 69*b* may be considered to be circumferential concave surfaces with their concave openings facing generally radially outwardly and external apex surfaces 68*a* and 68*b* may be considered to be circumferential convex apex surfaces, with their convex apex pointed generally radially inwardly. Double-stick tape 70*a* and 70*b* extends circumferentially between the respective joining surfaces 46*a* and 46*b* and perimeter portions 38*a* and 38*b*, and are shown here as a representative means to join the rim shells 34*a* and 34*b* to the outer rim 32.

Next, the rim shells 34*a* and 34*b* are assembled to the outer rim 32 in their respective directions 60*a* and 60*b* such that respective perimeter portions 38*a* and 38*b* are joined to their corresponding joining surfaces 46*a* and 46*b*, as shown in FIG. 2*f*. At this step, edges 66*a* and 66*b* are butted against each other as shown and apex portions 40*a* and 40*b* are not yet overlapping. Sidewall portions 62*a* and 62*b* are shown here to be generally flexible and elastically flex to temporarily distort to permit the initially assembled orientation described in FIG. 2*f*. With the perimeter portions 38*a* and 38*b* joined to the outer rim 32, the apex portions 40*a* and 40*b* are then pressed toward each other in respective directions 64*a* and 64*b* such that the rim shells 34*a* and 34*b* elastically flex to further accommodate overlie 52 and allow edge 66*b* to slip over external apex surface 68*a* until apex portion 40*a* is overlapped with apex portion 40*b* and convex external apex surface 68*a* is nested with concave internal apex surface 69*b* as shown in FIG. 2*g*. 34*a* and 34*b* have not been significantly yielded during this assembly procedure, their stiffness causes external apex surface 68*a* to press against internal apex surface 69*b* and maintain their nested configuration and to retain the two components to each other and resist inadvertent disassembly. Such an overlie assembly is commonly termed a "snap-fit". In this case, the overlie 52 is a generally radial overlie, however other designs may include an axial or circumferential overlie as a means to connect the rim shells 34*a* and 34*b* to each other and/or to the outer rim 32.

The interface between external apex surface 68*a* and internal apex surface 69*b* constitutes overlapping joining interface 56. Adhesive and/or mechanical fasteners may be utilized in this joining interface to augment the snap-fit connection between apex portions 40*a* and 40*b*. It is shown in FIG. 2*g* that a hollow rim assembly 39 is created to include cavity 58 that is bounded by outer rim 32, rim shell 34*a* and rim shell 34*b*.

It should be noted that this embodiment describes an elastic snap-fit between apex portions 40*a* and 40*b*. This means that the rim shells 34*a* and 34*b* are flexed or deformed to a stress within the elastic range of the material. Alternatively, rim shells 34*a* and 34*b* and/or outer rim 32 may be plastically deformed and yielded to engage the other. For example, the apex portion 40b may be crimped to capture and engage apex portion 40a.

FIG. 2h shows how mechanical fasteners, such as rivets 74a and 74b, may be utilized to create or augment the connection between the rim shells 34a and 34b and the outer rim 32. Rivets 74a and 74b are representative of a wide range of mechanical fasteners that may be utilized to mechanically lock the perimeter portions 38a and 38b to their respective joining surfaces 46a and 46b of the outer rim 32. Similarly, a wide range of alternate mechanical fasteners, such as screws and the like, may be utilized to create or augment the connection between apex portion 40a and apex portion 40b.

Figure 2I:
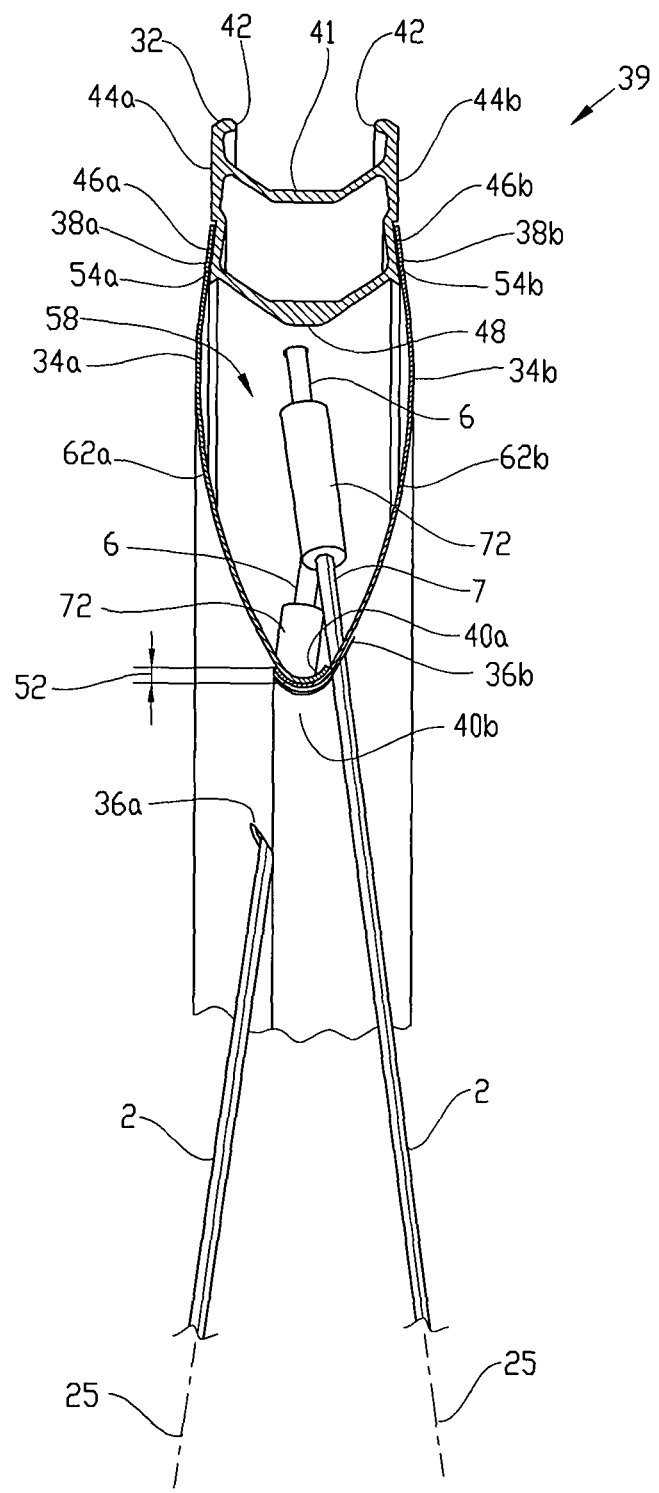
FIG. 2i is a cross-sectional view of the embodiment of FIG. 2b, taken along 22-22, including an enlarged portion of the spoke enclosed by the rim shells.

FIG. 2i corresponds to FIG. 2d in most respects. However, spoke 2 includes an enlarged portion 72 adjacent its second end 6 and a mid-portion 7 of reduced cross section. It is noted that this enlarged portion 72 is too large in cross-section to pass through its respective slot 36a or 36b. If enlarged portion 72 were to be assembled along its longitudinal axis 25 through this slot 36a or 36b, this slot 36a or 36b would need to be oversized to allow passage of the enlarged portion 72. In such a case, with mid-portion 7 positioned in respective slot 36a or 36b during final assembly, this slot 36a or 36b would necessarily then have excessive clearance with the mid-portion 7. Similarly, if holes were substituted for slots 36a and 36b, then these holes would need to be oversized to permit passage of the enlarged portions 72, thus leaving excessive clearance between the holes and their respective mid portions 7. This excessive clearance would reduce aerodynamic efficiency and aesthetics. However, since the rim shells 34a and 34b may be assembled around the spokes 2 in a generally axial direction as described in FIGS. 2d-f, the slots 36a and 36b are assembled to interface only with the mid-portion 7 and thus slots 36a and 36b may be sized for close fitment with the mid-portion 7. Thus, FIG. 2h illustrates a significant benefit of the present invention, which permits the enlarged portion 72 to be aerodynamically shielded and enclosed within cavity 58, while slot 36 has a close fit with the spoke 2.

While the embodiment of FIGS. 2a-i shows two discreet preformed rim shells 34a and 34b, FIG. 3a describes an embodiment where the rim assembly 101 includes a singular one-piece rim shell 100. Outer rim 102 is similar to that described in FIGS. 2a-g, however it includes a generally radially inboard-facing joining surface 104. Rim shell 100 includes outboard portion 110, sidewall portions 106a and 106b, and corresponding apex portions 108a and 108b. At their radially outboard periphery, sidewall portions 106a and 106b are integral with the outboard portion 110, which is joined to the joining surface 104 of the outer rim 102 at a joining interface 112, preferably via adhesive or a fastening means as previously described. Outboard portion 110 overlaps joining surface 104 in an axially overlapping joining interface. Adhesive or fasteners or other joining means may be utilized at the joining interface to fortify the joinder between the rim shell 100 and the outer rim 102. Rim shell 100 may alternatively be retained to the outer rim via mating interference and/or retaining geometry. Thus rim shell 100 is joined to the outer rim 102 via an overlapping joinder. Rim shell 100 is also shown to enclose cavity 116.

The geometry of apex portions 108a and 108b are similar to the corresponding apex portions 40a and 40b of FIGS. 2a-g. Apex portion 108a may be snap-fit to apex portion 108b by pressing in the corresponding apex portions 108a and 108b against each other in corresponding directions 114a and 114b in the manner previously described in FIGS. 2a-i. Apex portions 108a and 108b interface with the spokes 2 in a manner described in FIGS. 2a-i.

FIGS. 3b-c describe an embodiment where the rim shell elements 200a and 200b have an overlie engagement with the outer rim 202 and, as shown, may be snap-fit with the outer rim 202. As shown in FIG. 3b, outer rim 202 includes a tire bed wall 216 and a spoke bed wall 218, with radial inboard extensions 212a and 212b adjacent their corresponding radial outboard recesses 214a and 214b. Rim shells 200a and 200b include corresponding sidewall portions 204a and 204b and perimeter portions 206a and 206b. Rim shells 200a and 200b also include corresponding radially outboard apex portions 210a and 210b and radially inboard apex portions 208a and 208b, with edges 209a and 209b.

As shown in FIG. 3b, rim shell 200a is engaged to the outer rim 202, with outboard apex 210a engaged and nested with recess 214a. Outboard apex 210a has a radial overlie distance 220a with the extension 212a and the spoke bed wall 218. Thus, outboard apex 210a is shown to be captured and engaged to recess 214a, thereby engaging rim shell 200a to outer rim 202. Rim shell 200b is shown prior to its assembly with outer rim 202 and rim shell 200a. It may be seen that outboard apex 210b has a radial overlie distance 220b with respect to the extension 212b and also with the spoke bed wall 218.

As rim shell 200b is assembled to the outer rim 202 in direction 222, outboard apex 210b is pressed against extension 212b, forcing the outboard apex 210b to flex radially inward to clear past the extension 212b. With further assembly in direction 222, outboard apex 210b becomes axially aligned with recess 214b, permitting the outboard apex 210b to elastically spring back to its un-flexed position, with the outboard apex 210b nested and retained within recess 214b. Thus, it may be seen that outboard apex 210b has a radially overlying snap-fit engagement with the outer rim 202.

As previously described in FIGS. 2e-h, apex portion 208b is also pressed toward apex portion 208a in direction 222 such that the rim shells 200a and 200b flex slightly to allow apex portion 208b to snap over and nest with apex portion 208a as shown in FIG. 3c. It is shown that there is a radial overlie distance 224 between the edge 209b and inboard apex 208a. When edge 209b is pushed toward apex portion 208a, rim shells 200a and 200b flex slightly, permitting edge 209b to push axially past apex portion 208a and then flex back such that apex portion 208a is now nested and retained within apex portion 208b, as shown in FIG. 3c. Thus, it may be seen that apex portion 208b has a radially overlying snap-fit engagement with apex portion 208a. A rim assembly 201 is thus created to include a hollow rim cavity 226 that is bounded by outer rim 202, rim shell 200a and rim shell 200b.

It is noted that the embodiment of FIGS. 3b-c describe snap-fit connections between outboard apexes 210a and 210b with the outer rim 202 as well as snap-fit connections between apex portions 208a and 208b. While these snap-fit connections provide easy assembly and disassembly without damaging the components involved, it is also envisioned that a more robust connection may be achieved through a more positive overlying connection that may be difficult to disassemble without damaging the components. Further, the components may be assembled to each other through a variety of overlying engagement means outside of a snap-fit. For example, the continuous circumferential outer rim 202 hoop may first be split into a "C" shape with a radial seam at two rim ends. These rim ends may be temporarily spread to create a gap between its two ends to permit circumferential expansion of the rim hoop. The ends of the outer rim 202 are then re-joined to capture the rim shells 200a and 200b. A wide range of alternate connection configurations are envisioned that utilize an overlie engagement to connect the rim shells to each other or to the outer rim 202. Further, the overlie engagement may be augmented with adhesive or fasteners or other joining means.

The embodiment of FIG. 3d provides a representative description of alternate joint configurations involved in joining rim shell(s) to each other and/or to an outer rim. Outer rim 118 is similar to outer rim 102 of FIG. 3a and includes spoke bed 123 and joining surface 119. Rim shells 120a and 120b include corresponding collars 126a and 126b, sidewalls 130a and 130b, and apex portions 122a and 122b respectively. Collars 126a and 126b are joined to joining surface 119 at overlapping joining interfaces 121a and 121b respectively in a manner previously described. Since the joining interfaces 121a and 121b extend in a generally axial direction, they may be considered as axially overlapping interfaces.

This joining interfaces 121a and 121b may constitute a permanent joinder between rim shells 120a and 120b, where the joining interfaces 121a and 121b may not be disassembled without damaging at least one of the rim shells and/or the outer rim. Alternatively, the joining interfaces 121a and 121b may a removable interfaces and may be disassembled and reassembled without damage to the rim shells and/or the outer rim.

Apex portions 122a and 122b include joining surfaces 124a and 124b that extend in a generally radial direction and are joined to each other at joining interface 128. If desired, the joining interface 128, which is commonly considered a "butt joint" type of arrangement, may include adhesive and/or fasteners to augment this joinder. Alternatively, no adhesive may be necessary and joining surfaces 124a and 124b may simply be near each other or otherwise pressed against each other via preload provided by the stiffness of the rim shells 120a and 120b. As a further alternative, joining surfaces 124a and 124b may be separated by a slight gap (not shown) and apex portions 122a and 122b would not be joined to each other at all.

While the embodiment of FIGS. 2a-i describe rim shells of relatively constant wall thickness 50a and 50b, FIG. 3d shows that the thickness 132 of the sidewalls 130a and 130b of rim shells 120a and 120b to be thinner than the thickness 134 of apex portions 122a and 122b. In this example, the thicker wall thickness 134 provides a larger surface area at the joining interface 128. Variable wall thickness may also allow the geometry and stiffness of the rim shell to be more specifically tailored to the desired function and/or aesthetics of the rim shell elements.

The embodiment of FIG. 3e provides a representative description of an alternate means of joining rim shell(s) to each other and/or to an outer rim. Outer rim 118 is includes spoke bed 113 and joining surface 119. Rim shells 140a and 140b include corresponding axially-extending collars 141a and 141b, sidewalls 142a and 142b, and apex portions 144a and 144b respectively. Collar 141b is joined to joining surface 119 at an axial overlapping joining interface 146, whereas collar 141a is joined to the inboard surface of flange 141b at joining interface 148 in an axially-extending overlap arrangement as previously described.

Apex portions 144a and 144b include joining collars 150a and 150b respectively that extend in a generally axial direction and are joined to each other at joining interface 152. If desired, the joining interface 152, which is commonly considered a "lap joint" type of arrangement, may include adhesive and/or fasteners to augment this joinder. Alternatively, no adhesive may be necessary and joining flanges 150a and 150b may simply overlap each other.

Figure 4A:
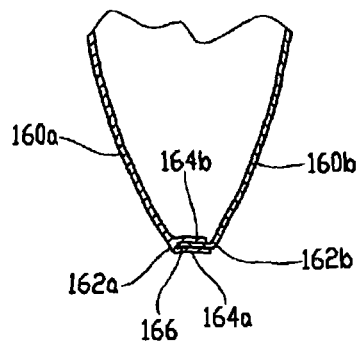
FIGS. 4a-e are partial cross-sectional views, similar to the view of FIG. 2d, detailing a range of alternate joint configurations between rim shells.

FIGS. 4a-e provide additional representative geometry descriptions of alternate joinder geometry between mating rim shell(s) at their respective apex portions. FIG. 4a shows two opposing rim shells 160a and 160b with corresponding apex portions 162a and 162b. Apex portion 162a includes two axially-extending collars 164a and 164b while apex portion 162b includes one opposing axially extending collar 166. Collar 166 is nested between collars 164a and 164b in a double-lap joint configuration as shown. In comparison with the single-lap joining interface 152 of FIG. 3e, this double-lap joint provides increased surface area of overlap and provides improved alignment between mating collars 166 and 164a and 164b. Adhesive and/or fasteners may be utilized to lock collars 166 and 164a and 164b together. Thus, rim shells 160a and 160b are joined to each other at the seam where they meet in apex region 161.

Figure 4B:
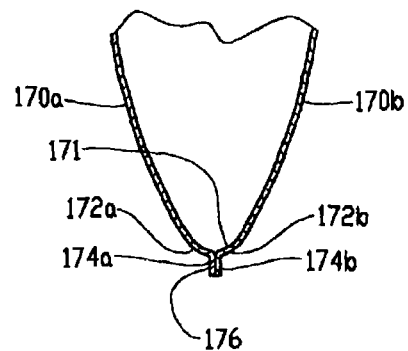

FIG. 4b shows two opposing rim shells 170a and 170b with corresponding apex portions 172a and 172b respectively. Apex portions 172a and 172b include radially inwardly extending flanges 174a and 174b respectively. Flanges 174a and 174b meet each other at joining interface. 176, as shown. If desired, adhesive and/or fasteners may be utilized in apex portions 172a and 172b or at the joining interface 176 to lock flanges and 174a and 174b together. Thus, rim shells 170a and 170b are joined to each other at the radially extending seam where they meet in apex region 171 and joining interface 176 may be considered a radial joining interface.

Figure 4C:
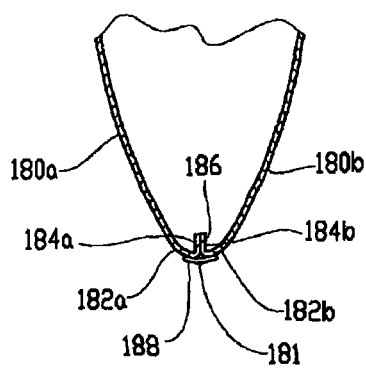

FIG. 4c shows two opposing rim shells 180a and 180b with corresponding apex portions 182a and 182b. Apex portions 182a and 182b include radially outwardly extending flanges 184a and 184b respectively. Flanges 184a and 184b meet each other at joining interface 186, as shown. Cover plate 188 may be considered to be an intermediate connecting element that spans across joining interface 186 and is joined to both apex portions 182a and 182b at the interface where they contact each other as shown, thereby joining both apex portions 182a and 182b to each other. Cover plate 188 may be made of adhesive tape or it may be a more rigid element. It is noted that cover plate 188 may alternatively be considered as an extension of rim shell 180a that overlaps apex portion 182b and/or as an extension of rim shell 180b that overlaps apex portion 182a. Adhesive and/or fasteners may be utilized in apex portions 182a and 182b or at the joining interface 186 to lock flanges and 184a and 184b together. Thus, rim shells 180a and 180b are joined to each other at the seam where they meet in apex region 181.

Figure 4D:
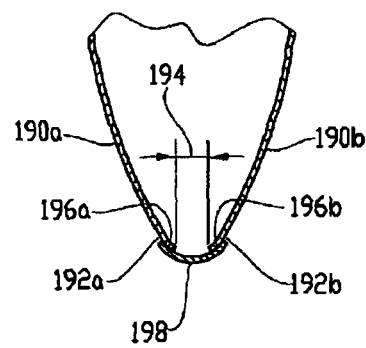

FIG. 4d shows two opposing rim shells 190a and 190b with corresponding apex portions 192a and 192b. It may be seen that apex portions 192a and 192b do not actually meet each other. Instead there exists a gap 194 between apex portions 192a and 192b at apex region 191. Cover plate 198 may be considered to be an intermediate connecting element that spans between rim shells 190a and 190b to bridge the gap 194 and is joined to apex portion 192a at joining interface 196a and to apex portion 192b at joining interface 196b. Joining interfaces 196a and 196b have an overlapping lap joint configuration. Cover plate 198 serves as an intermediate element that spans and connects apex portions 192a and 192b. It is noted that cover plate 198 may alternatively be considered as an extension of rim shell 190a that overlaps apex portion 192b and/or as an extension of rim shell 190b that overlaps apex portion 192a. Cover plate 198 may be made of flexible adhesive tape or it may be a more rigid element. Adhesive and/or fasteners may alternatively be utilized at joining interfaces 196a and 196b to join rim shells 190a and 190b together. Thus, rim shells 190a and 190b are joined to each other at the seam where they meet in apex region 191.

Figure 4E:
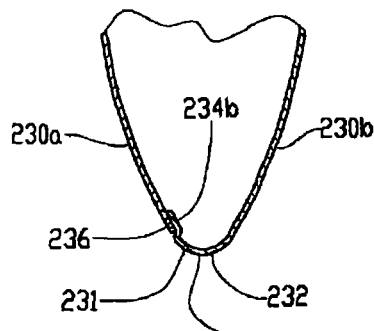

FIG. 4e shows two opposing rim shells 230a and 230b. Rim portion 230b includes apex portion 232 and flange 234b. Note that rim shell 230a does not have an apex portion per se that extends well into the apex region 231. Rim shell 230a is joined to the flange 234b at an overlapping joining interface 236 as shown and as described previously. While many of the embodiments of the present invention describe opposing rim shells that are generally symmetrical to each other, the embodiment of FIG. 4e is a representative embodiment that describes opposing rim shells that are asymmetrical to each other. Further, it should be noted that the joining interface 236 is not directly coincident with the radially inboard true apex 237 of the apex portion 232, but is instead is located radially outboard of the true apex 237 and closer to the periphery of the apex region 231.

Figure 4F:
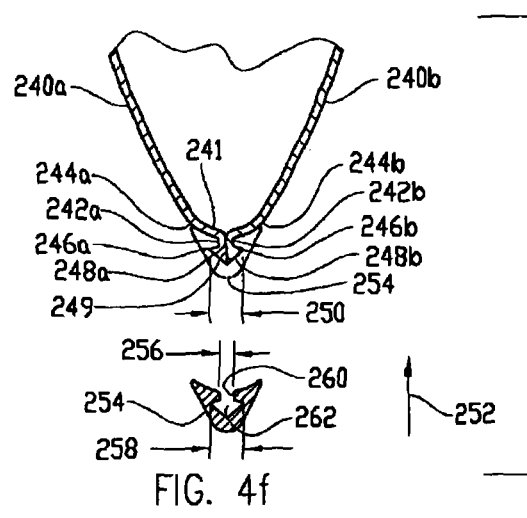
FIG. 4f is a partial cross-sectional views, similar to the view of FIG. 2d, detailing an alternate joint configuration between rim shells, including a coupling cap to join the rim shells adjacent the apex portions.

FIG. 4f shows two opposing rim shells 240a and 240b, including corresponding apex portions 244a and 244b. Apex portions 244a and 244b incorporate geometry for mating with coupling cap 254, including axial recesses 242a and 242b, axial ridges 246a and 246b, and ramped surfaces 248a and 248b respectively. Rim shells 240a and 240b meet each other at joining interface 249. Axial ridges 246a and 246b extend axially outwardly from axial recesses 242a and 242b and are separated by distance 250. Coupling cap 254 is made of flexible material and includes a necked region 260 of narrower axial width 256 and enlarged region 262 of wider axial width 258.

As the coupling cap 254 is assembled to the apex portions 244a and 244b in the generally radial outboard direction 252 as shown, necked region 260 is pressed against ramped surfaces 248a and 248b. Further assembly in direction 252, serves to wedge and elastically flex the coupling cap 254, causing the necked region 260 to spread wider, allowing it to pass past axial ridges 246a and 246b. The coupling cap 254 may now spring back to its original shape, with the necked region nested within the axial recesses 242a and 242b and axial ridges 246a and 246b located within enlarged region 262. Thus, the coupling cap 254 serves as a snap-fit joining clip to retain the apex portions 244a and 244b to each other, a fastening means well known in industry. It should be noted that there is a generally axial overlie between the narrower axial width 256 of the coupling cap and the wider axial distance 250 between axial ridges 246a and 246b, which serves to retain the coupling cap 254 to the rim shells 240a and 240b. Coupling cap 254 may alternatively be considered as an extension of rim shell 240a that overlaps apex portion 244b and/or as an extension of rim shell 240b that overlaps apex portion 244a.

Figure 5A:
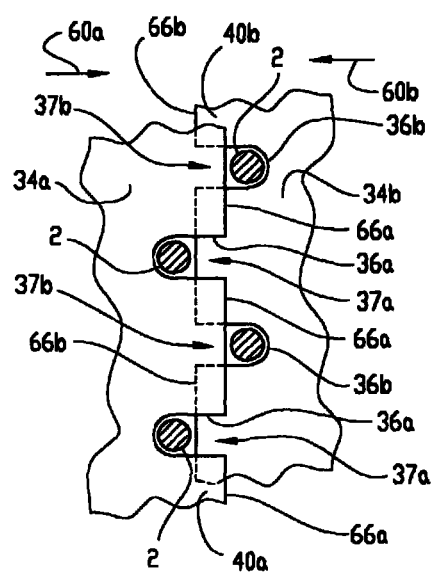
FIG. 5a is a detail view of the rim assembly of FIG. 2d as seen generally in the direction 43-43 of FIG. 2d, with spokes in cross section and detailing the interface of the slots and the spoke.

FIG. 5a provides a detail view of the embodiment of FIGS. 2a-i showing the interaction of the rim shells 34a and 34b with the spokes 2. When rim shells 34a and 34b are assembled to each other in the directions 60a and 60b respectively, it may be seen that apex portion 40a of rim shell 34a has an axial overlap with apex portion 40b of rim shell 34b. Spokes 2 are introduced through open portions 37a and 37b until they are nested in their corresponding slots 36a and 36b as shown. When apex portion 40a is snap fit with apex portion 40b, edge 66a overlaps edge 66b and apex portion 40a partially covers slot 36b to closely follow the cross section of the spoke 2. Simultaneously, apex portion 40b partially covers slot 36a. Thus, the slots 36a and 36b allows easy assembly of the rim shells 34a and 34b to each other while the spokes are already laced to the outer rim 32 (not shown). Also, the overlapping apex portions 40a and 40b serve to partially cover the slots for enhanced aerodynamics and a clean aesthetic appearance.

Figure 5B:
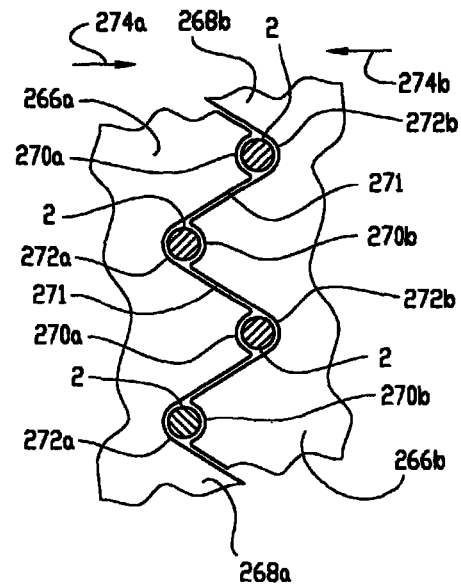
FIG. 5b is a detail view similar to FIG. 5a, and illustrating an alternate configuration of the rim assembly, with spokes in cross section and detailing the interface of nested apex portions and the spoke.

FIG. 5b shows an embodiment where rim shells 266a and 266b include corresponding apex portions 268a and 268b, each with associated tongues 270a and 270b and grooves 272a and 272b. With rim shells 266a and 266b assembled together in the generally axial directions 274a and 274b respectively as shown, apex portions 268a and 268b do not overlap as in FIG. 5a. Instead, tongue 270a abuts and nests in groove 272b at an abutting interface 271 to closely surround the cross section of the spoke 2 within the abutting interface 271. Similarly, tongue 270b nests in groove 272a at an abutting interface 271 to closely surround the cross section of the spoke 2 within the abutting interface 271. Grooves 272a and 272b may be considered as open-ended openings of their associated rim shells 266a and 266b respectively, in a manner similar to slots 36a and 36b of FIG. 5a. In FIG. 5b, tongues 270a and 270b are circumferentially aligned to extend axially within the opposing grooves 272b and 272a respectively to create the staggered zig-zag abutting interface 271 shown here. Thus, the tongues 270a and 270b and grooves 272a and 272b allows easy assembly of the rim shells 266a and 266b to each other while the spokes are already laced to the outer rim (not shown). Also, the spokes 2 are closely surrounded by apex portions 268a and 268b for enhanced aerodynamics and a clean aesthetic appearance.

Figure 5C:
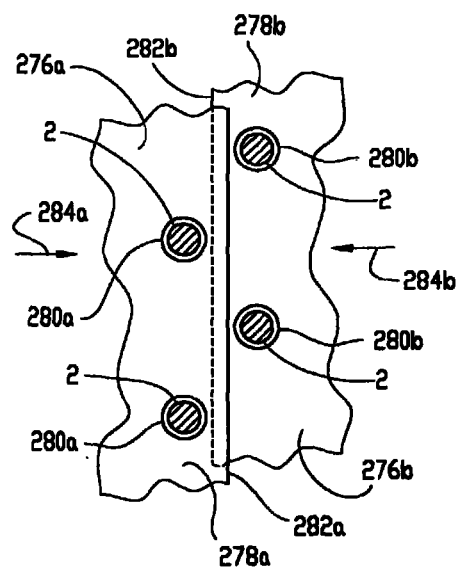
FIG. 5c is a detail view similar to FIG. 5a, and illustrating a second alternate configuration of the rim assembly, with spokes in cross section and detailing the interface of the apex portions and the spoke, including through holes.

FIG. 5c shows an embodiment where rim shells 276a and 276b include corresponding apex portions 278a and 278b, each with associated holes 280a and 280b and edges 282a and 282b. With rim shells 276a and 276b assembled together in the generally axial directions 284a and 284b respectively as shown, apex portions 278a and 278b overlap as shown and holes 280a and 280b are aligned to accept spokes 2 as shown. Unlike the embodiments of FIGS. 5a and 5b, the holes 280a and 280b are closed and surrounded by rim shell material. Thus, the spokes must be threaded through holes 280a and 280b to be laced to the outer rim (not shown) after the rim shells 276a and 276b are assembled together. This adds additional complexity to the manufacture and service of the wheel. Nevertheless, spokes 2 are closely surrounded by holes 280a and 280b for enhanced aerodynamics and a clean aesthetic appearance.

Figure 5D:
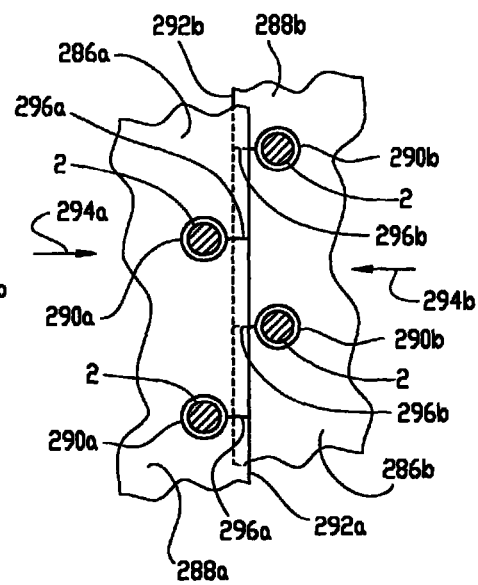
FIG. 5d is a detail view similar to FIG. 5a, and illustrating a third alternate configuration of the rim assembly, with spokes in cross section and detailing the interface of the apex portions and the spoke, including through holes with access split.

FIG. 5d shows an embodiment very similar to the embodiment of FIG. 5c where rim shells 286a and 286b include corresponding apex portions 288a and 288b, each with associated holes 290a and 290b and edges 292a and 292b. With rim shells 286a and 286b assembled together in the generally axial directions 294a and 294b respectively as shown, apex portions 288a and 288b overlap as shown and holes 290a and 290b are aligned to accept spokes 2 as shown. Unlike the embodiment of FIG. 5c, the holes 290a and 290b include access slits 296a and 296b, where the corresponding apex portions include a self-closing split or slit extending between corresponding holes 290a and 290b and edges 292a and 292b. Slits 296a and 296b may be passively spread or curled by the spoke 2 to permit apex portions 288a and 288b to be moved past spoke 2 during assembly until holes 290a and 290b are aligned with their associated spokes 2. Upon assembly, with the spokes moved past slits 296a and 296b, these slits snap back into their closed position to surround the cross section of the spokes 2. Thus, the slits 296a and 296b allow for easy assembly of the rim shells 286a and 286b to each other while the spokes are already laced to the outer rim (not shown). Also, the spokes 2 are closely surrounded by apex portions 288a and 288b for enhanced aerodynamics and a clean aesthetic appearance.

While my above description contains many specificities, these should not be construed as limitations on the scope of the invention, but rather as exemplifications of embodiments thereof. For example:

While many of the embodiments of the present invention describe opposing rim shells that are generally symmetrical to each other, the embodiment of FIG. 4e describes opposing rim shells that are asymmetrical to each other.

While the outer rim and rim shell elements shown herein are shown as generally continuous circumferential elements, it is also envisioned that any of these elements may be discontinuous circumferential elements. In other words, the circumference may be interrupted or split in one location to create a circumferential "C"-shaped element or may be interrupted or split in a multiplicity of circumferentially spaced locations to create a multi-piece circumferential element. Further, the element(s) may not need to be circumferential at all, but may instead be located in an isolated region of the circumference of the rim assembly.

While the present invention describes a vehicle wheel with two axially spaced flanges, the number of flanges, as well as their orientation are not a requirement for the performance and function of the rim shells. For example, the rim shells of the present invention may be alternatively be utilized with a compression-spoke wheel with only a single hub flange.

While many of the embodiments described herein utilize pre-formed rim shell(s) and outer rim components, it is also envisioned that one or another of these components may alternatively be formed or molded in place. Further, one component may be formed against another to insure proper matching geometry. For example, the rim shell 100 of FIG. 3a may be molded by inflating a temporary internal bladder within cavity 116 in a method well known in industry for molding composite rims. The bladder may be utilized to press the outboard portion 110 against the joining surface 104, creating matched geometry and simultaneously bonding the rim shell 100 to the outer rim 102 during molding. A seam may be maintained between the apex portions 108a and 108b, either during molding or by splitting the rim shell in this location subsequent to molding.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications that are within its spirit and scope as defined by the claims.

The invention claimed is:

1. A vehicle wheel, comprising:
   a peripheral rim including a radially outboard spoke bed portion and an apex region radially inboard from said spoke bed portion;
   a central hub with a hub flange;
   an axial axis of rotation;
   a plurality of spokes extending between the peripheral rim and central hub, wherein said spokes have a second portion with a direct structural connection to said spoke bed portion and a first portion opposed to said second portion and connected to said central hub;
   wherein said apex region includes a first apex portion and a second apex portion adjacent said first apex portion and a seam between said first apex portion and said second apex portion and including a first sidewall portion extending between said spoke bed portion and said first apex portion and a second sidewall portion extending between said spoke bed portion and said second apex portion;
   wherein said first apex portion is adjacent said second apex portion at said seam to enclose a circumferential internal cavity radially inboard of said spoke bed portion;
   wherein said peripheral rim constitutes an assembly including: (i) at least one outer rim element that includes said spoke bed portion and (ii) at least one rim shell element that includes at least one of said first apex portion and said second apex portion discreet from said first apex portion, wherein said outer rim element is connected to said rim shell element at an outer joining interface;
   wherein said seam is independent of said outer joining interface;
   including an inner joining interface at said seam, wherein said first apex portion is joined to said second apex portion at said inner joining interface;
   including a plurality of said rim shell elements, wherein a first of said rim shell elements includes said first apex portion and wherein a second of said rim shell elements includes said second apex portion; and
   wherein said inner joining interface includes a generally axial overlapping interface.

2. A wheel according to claim 1, wherein said seam is a generally circumferential seam that is circumferential about said axial axis.

3. A wheel according to claim 1, wherein said first rim shell element is generally symmetrical to said second rim shell element.

4. A wheel according to claim 1, wherein said rim shell encloses said circumferential internal cavity and wherein said circumferential internal cavity is a generally continuous circumferential internal cavity.

5. A wheel according to claim 1, wherein said inner joining interface is between a preformed portion of said first rim shell element and a preformed portion of said second rim shell element.

6. A wheel according to claim 1, wherein said rim shell element is a continuous circumferential element.

7. A wheel according to claim 1, wherein said outer joining interface is a generally circumferential joining interface.

8. A wheel according to claim 1, wherein said outer joining interface is an adhesively bonded joining interface.

9. A wheel according to claim 1, wherein said outer joining interface is a mechanically fastened joining interface.

10. A wheel according to claim 1, wherein said outer joining interface includes a radial overlie engagement.

11. A wheel according to claim 10, wherein said outer joining interface includes a snap fit engagement.

12. A wheel according to claim 11, wherein said rim shell element is assembled to said outer rim element in a generally axial direction to achieve said snap fit engagement.

13. A wheel according to claim 1, wherein said outer joining interface includes a generally radial overlapping interface.

14. A wheel according to claim 1, wherein said outer joining interface includes a generally axial overlapping interface.

15. A wheel according to claim 1, wherein said outer joining interface is a permanent joining interface where the joining interface may not be disassembled without damaging to at least one of said outer rim and said rim shell element.

16. A wheel according to claim 1, wherein said outer joining interface is a removable joining interface where the joining interface may be disassembled without damaging said outer rim or said rim shell element.

17. A wheel according to claim 1, wherein said inner joining interface is a permanent joining interface where the inner joining interface may not be disassembled without damaging at least a portion of said rim shell element.

18. A wheel according to claim 1, wherein said inner joining interface is a removable joining interface where the inner joining interface may be disassembled without damaging said rim shell element.

19. A wheel according to claim 1, wherein said first apex portion is connected to said second apex portion by means of an intermediate connecting element at said inner joining interface.

20. A wheel according to claim 19, wherein said intermediate connecting element is a cover plate.

21. A wheel according to claim 19, wherein said intermediate connecting element is a joining clip.

22. A wheel according to claim 19, including a snap fit between said intermediate connecting element and at least one of said first apex portion and said second apex portion.

23. A wheel according to claim 19, wherein said intermediate connecting element is adhesive tape.

24. A wheel according to claim 19, wherein said intermediate connecting element is joined to at least one of said first apex portion and said second apex portion at said inner joining interface that is external to said internal cavity.

25. A wheel according to claim 1, wherein said inner joining interface is an adhesively bonded joining interface.

26. A wheel according to claim 1, wherein said inner joining interface is a mechanically fastened joining interface.

27. A wheel according to claim 1, wherein said inner joining interface includes an overlie engagement.

28. A wheel according to claim 27, wherein said inner joining interface includes a snap fit engagement.

29. A wheel according to claim 1, wherein said inner joining interface includes a generally radial overlapping interface.

30. A wheel according to claim 1, wherein at least one of said first rim shell element and said second rim shell element includes a hole therethrough and wherein at least one of said spokes extends through said hole.

31. A wheel according to claim 1, wherein said spoke includes an enlarged portion of larger cross-section dimension and a mid portion of smaller cross-section dimension located radially inboard of said enlarged portion and wherein said enlarged portion is radially outboard of said apex region and enclosed within said internal cavity and wherein said enlarged portion is located radially inboard of said spoke bed portion.

32. A wheel according to claim 1, including a radial gap between said outer rim element and at least one of said first apex portion and said second apex portion.

33. A wheel according to claim 1, wherein at least one of said plurality of said spokes includes a structural span portion extending between said first portion and said second portion and wherein said span portion extends within said internal cavity.

34. A wheel according to claim 1, wherein said rim shell element connects to said outer rim element in a generally axial direction.

35. A wheel according to claim 1, wherein said spokes connect to said spoke bed prior to connecting said rim shell element to said outer rim element.

36. A wheel according to claim 1, wherein said rim shell element is has contoured geometry formed from pressure formed sheet material.

37. A wheel according to claim 1, wherein said rim shell element is a generally thin element with a generally uniform cross sectional thickness.

38. A wheel according to claim 1, wherein said first apex portion joins said second apex portion in a generally axial direction.

39. A wheel according to claim 1, wherein said inner joining interface is a generally continuous circumferential joining interface that is circumferential about said axial axis.

40. A wheel according to claim 1, wherein said inner joining interface includes a butt joint.

41. A wheel according to claim 1, wherein said first apex portion is plastically deformed to engage said second apex portion at said inner joining interface.

42. A wheel according to claim 1, wherein said first apex portion is elastically deformed to engage said second apex portion at said inner joining interface.

43. A wheel according to claim 1, including direct contact between said first apex portion and said second apex portion at said inner joining interface.

44. A wheel according to claim 1, including a gap between said first apex portion and said second apex portion at said inner joining interface.

45. A wheel according to claim 1, wherein said rim shell element includes a true apex comprising the radially inboard periphery of said first rim shell element and wherein said inner joining interface between said first rim shell element and said second rim shell element is located radially outboard of said true apex.

46. A wheel according to claim 1, wherein said inner joining interface is independent of said connection between said rim shell element and said outer rim element.

47. A wheel according to claim 1, wherein said outer rim element includes a radially inwardly projecting extension portion and wherein said extension portion serves to at least one of retain and engage said rim shell element to said outer rim element.

48. A wheel according to claim 47, wherein said outer rim element is temporarily expanded in a radially outwardly direction to reduce radial overlie between said outer rim element and said rim shell element and wherein said outer rim element is subsequently circumferentially contracted to achieve said radial overlying engagement.

49. A wheel according to claim 1, wherein said circumferential cavity is radially inboard of said outer rim.

50. A wheel according to claim 1, wherein said first apex portion is directly connected to said second apex portion at said inner joining interface.

51. A vehicle wheel, comprising:
a peripheral rim including a radially outboard spoke bed portion and an apex region radially inboard from said spoke bed portion;
a central hub with a hub flange;
an axial axis of rotation;
a plurality of spokes extending between the peripheral rim and central hub, wherein said spokes have a first portion with a direct structural connection to said spoke bed portion and a second portion opposed to said first portion;
wherein said apex region includes a first apex portion and a second apex portion adjacent said first apex portion and a seam between said first apex portion and said second apex portion and including a first sidewall portion extending between said spoke bed portion and said first apex portion and a second sidewall portion extending between said spoke bed portion and said second apex portion;
wherein said first apex portion is adjacent said second apex portion at said seam to enclose a circumferential internal cavity radially inboard of said spoke bed portion;
wherein said peripheral rim constitutes an assembly including: (i) at least one outer rim element that includes said spoke bed portion and (ii) at least one rim shell element that includes at least one of said first apex portion and said second apex portion discreet from said first apex portion, wherein said outer rim element is connected to said rim shell element at an outer joining interface;

wherein said seam is independent of said outer joining interface;

wherein said rim shell element includes an open ended slot therethrough and wherein at least one of said spokes extends through said open ended slot; and wherein said open ended slot is in said first apex portion and wherein said second apex portion covers at least a portion of said open ended slot.

52. A vehicle wheel, comprising:

a peripheral rim including a radially outboard spoke bed portion and an apex region radially inboard from said spoke bed portion;

a central hub with a hub flange;

an axial axis of rotation;

a plurality of spokes extending between the peripheral rim and central hub, wherein said spokes have a second portion with a direct structural connection to said spoke bed portion and a first portion opposed to said second portion and connected to said central hub;

wherein said apex region includes a first apex portion and a second apex portion adjacent said first apex portion and a seam between said first apex portion and said second apex portion and including a first sidewall portion extending between said spoke bed portion and said first apex portion and a second sidewall portion extending between said spoke bed portion and said second apex portion;

wherein said first apex portion is adjacent said second apex portion at said seam to enclose a circumferential internal cavity radially inboard of said spoke bed portion;

wherein said peripheral rim constitutes an assembly including: (i) at least one outer rim element that includes said spoke bed portion and (ii) at least one rim shell element that includes at least one of said first apex portion and said second apex portion discreet from said first apex portion, wherein said outer rim element is connected to said rim shell element at an outer joining interface;

wherein said seam is independent of said outer joining interface;

wherein said first apex portion includes a first concave contour and said second apex portion includes a second concave contour;

wherein said first concave contour overlaps said second concave contour; and wherein the opening of said first concave contour and the opening of said second concave contour faces generally radially outwardly.

53. A vehicle wheel, comprising:

a peripheral rim including a radially outboard spoke bed portion and an apex region radially inboard from said spoke bed portion;

a central hub with a hub flange;

an axial axis of rotation;

a plurality of spokes extending between the peripheral rim and central hub, wherein said spokes have a second portion with a direct structural connection to said spoke bed portion and a first portion opposed to said second portion and connected to said central hub;

wherein said apex region includes a first apex portion and a second apex portion adjacent said first apex portion and a seam between said first apex portion and said second apex portion and including a first sidewall portion extending between said spoke bed portion and said first apex portion and a second sidewall portion extending between said spoke bed portion and said second apex portion;

wherein said first apex portion is adjacent said second apex portion at said seam to enclose a circumferential internal cavity radially inboard of said spoke bed portion;

wherein said peripheral rim constitutes an assembly including: (i) at least one outer rim element that includes said spoke bed portion and (ii) at least one rim shell element that includes at least one of said first apex portion and said second apex portion discreet from said first apex portion, wherein said outer rim element is connected to said rim shell element at an outer joining interface;

wherein said seam is independent of said outer joining interface;

wherein said circumferential cavity includes a radially extending gap between said outer rim and said seam; and wherein at least one of said spokes abuts said seam.

54. A vehicle wheel, comprising:

a peripheral rim including a radially outboard spoke bed portion and an apex region radially inboard from said spoke bed portion;

a central hub with a hub flange;

an axial axis of rotation;

a plurality of spokes extending between the peripheral rim and central hub, wherein said spokes have a first portion with a direct structural connection to said spoke bed portion and a second portion opposed to said first portion;

wherein said apex region includes a first apex portion and a second apex portion adjacent said first apex portion and a seam between said first apex portion and said second apex portion and including a first sidewall portion extending between said spoke bed portion and said first apex portion and a second sidewall portion extending between said spoke bed portion and said second apex portion;

wherein said first apex portion is adjacent said second apex portion at said seam to enclose a circumferential internal cavity radially inboard of said spoke bed portion;

wherein said peripheral rim constitutes an assembly including: (i) at least one outer rim element that includes said spoke bed portion and (ii) at least one rim shell element that includes at least one of said first apex portion and said second apex portion discreet from said first apex portion, wherein said outer rim element is connected to said rim shell element at an outer joining interface;

wherein said seam is independent of said outer joining interface;

wherein said rim shell element includes an opening therethrough and wherein at least one of said spokes extends through said opening; and wherein said rim shell element includes a peripheral edge adjacent at least one of said first apex portion and said second apex portion and wherein said opening extends to said peripheral edge.

55. A wheel according to claim 54, wherein said opening includes an access slit extending to said peripheral edge.

56. A wheel according to claim 54, wherein said opening is an open ended slot, and wherein said open ended slot extends to said peripheral edge.

57. A wheel according to claim 54, wherein said opening is in said first apex portion and wherein said second apex portion overlaps at least a portion of said opening.

58. A wheel according to claim 54, wherein said opening is an open ended groove in said first apex portion and wherein said second apex portion includes a tongue extending to axially nest within said open ended groove.

59. A wheel according to claim 54, wherein said rim shell element is a singular element that includes said first apex portion and said second apex portion.

60. A wheel according to claim 54, wherein said first apex portion abuts said second apex portion at an abutting interface.

61. A wheel according to claim 54, including a plurality of said rim shell elements, wherein a first of said rim shell elements includes said first apex portion and wherein a second of said rim shell elements includes said second apex portion.

62. A wheel according to claim 54, wherein said inner joining interface includes a generally axial overlapping interface.

63. A wheel according to claim 54, wherein said first apex portion abuts said second apex portion at an abutting interface and wherein said spokes extend through said abutting interface.

64. A wheel according to claim 54, wherein said spoke includes an enlarged portion of larger cross-section dimension and a mid portion of correspondingly smaller cross-section dimension located radially inboard of said enlarged portion and wherein said mid portion is located within said slot and wherein the cross sectional width of said enlarged portion is greater than the corresponding width of said opening and wherein said enlarged portion is located radially inboard of said spoke bed portion.

65. A wheel according to claim 54, wherein said rim shell element connects to said spoke in a generally axial direction such that said spoke enters said opening adjacent said peripheral edge and is positioned in said opening.

* * * * *